US008042780B2

(12) United States Patent
Wagner et al.

(10) Patent No.: US 8,042,780 B2
(45) Date of Patent: Oct. 25, 2011

(54) DRINKS HOLDER

(75) Inventors: Joerg Wagner, Kaiserslautern (DE); Andreas Weber, Contwig (DE)

(73) Assignee: TRW Automotive Electronics & Components GmbH, Enkenbach-Alsenborn (DE)

( * ) Notice: Subject to any disclaimer, the term of this patent is extended or adjusted under 35 U.S.C. 154(b) by 1186 days.

(21) Appl. No.: 10/532,370

(22) PCT Filed: Oct. 28, 2003

(86) PCT No.: PCT/EP03/11942
§ 371 (c)(1),
(2), (4) Date: Apr. 22, 2005

(87) PCT Pub. No.: WO2004/039627
PCT Pub. Date: May 13, 2004

(65) Prior Publication Data
US 2005/0269472 A1      Dec. 8, 2005

(30) Foreign Application Priority Data

Oct. 29, 2002   (DE) ............................ 202 16 675 U

(51) Int. Cl.
*A47K 1/08*      (2006.01)
(52) U.S. Cl. ............ 248/311.2; 297/188.15; 297/188.16
(58) Field of Classification Search ............... 248/311.2; 297/188.02, 188.14, 188.15, 188.16, 188.17
See application file for complete search history.

(56) References Cited

U.S. PATENT DOCUMENTS

| | | | |
|---|---|---|---|
| 1,586,289 A * | 5/1926 | Carpenter | 232/41 R |
| 3,306,566 A * | 2/1967 | Paulson et al. | 248/346.04 |
| 3,494,503 A * | 2/1970 | Kingsley | 312/306 |
| 4,693,440 A * | 9/1987 | Lalonde | 248/154 |
| 4,759,584 A * | 7/1988 | Dykstra et al. | 297/188.16 |
| 4,805,864 A * | 2/1989 | Votta | 248/311.2 |
| 4,927,108 A * | 5/1990 | Blazic et al. | 248/311.2 |
| 5,018,633 A * | 5/1991 | Toth et al. | 248/311.2 |
| 5,102,085 A * | 4/1992 | Wieczorek et al. | 248/311.2 |
| 5,246,151 A * | 9/1993 | Jabara | 224/544 |
| 5,248,183 A * | 9/1993 | Gignac et al. | 297/188.16 |
| D370,812 S * | 6/1996 | Simmonds | D6/531 |
| 5,620,228 A * | 4/1997 | Ito et al. | 297/188.17 |
| 5,634,621 A * | 6/1997 | Jankovic | 248/311.2 |
| 5,749,554 A * | 5/1998 | Avila et al. | 248/311.2 |
| 5,921,519 A * | 7/1999 | Dexter et al. | 248/311.2 |
| 6,099,062 A * | 8/2000 | Siegel | 296/37.12 |
| 6,170,787 B1 * | 1/2001 | Morgan | 248/311.2 |
| 6,196,434 B1 * | 3/2001 | Angran et al. | 224/549 |
| 6,230,948 B1 * | 5/2001 | Steiger et al. | 224/539 |
| 6,361,008 B1 | 3/2002 | Gravenstreter | |
| 2002/0063192 A1 * | 5/2002 | Porcelli | 248/311.2 |
| 2003/0062459 A1 * | 4/2003 | Bieck et al. | 248/311.2 |
| 2003/0155476 A1 * | 8/2003 | Nakaya | 248/311.2 |
| 2003/0197104 A1 * | 10/2003 | Heybl et al. | 248/311.2 |

FOREIGN PATENT DOCUMENTS

| | | |
|---|---|---|
| DE | 196 30 528 A1 | 2/1998 |
| DE | 100 29 485 A1 | 12/2001 |
| DE | 101 01 642 A1 | 7/2002 |
| DE | 101 17 202 A1 | 10/2002 |
| EP | 0 748 717 A1 | 12/1996 |

* cited by examiner

*Primary Examiner* — Terrell McKinnon
*Assistant Examiner* — Bradley Duckworth
(74) *Attorney, Agent, or Firm* — Tarolli, Sundheim, Covell & Tummino LLP

(57) ABSTRACT

A cup holder, especially for a motor vehicle, has a box-like pedestal (12) that has a placement surface (14) on its top, and a box-like cover (16) that is arranged over the pedestal. The side surfaces of the pedestal (12) serve as a guide for the cover (16), the cover having a recess (18) that is concentric with the placement surface (14).

8 Claims, 4 Drawing Sheets

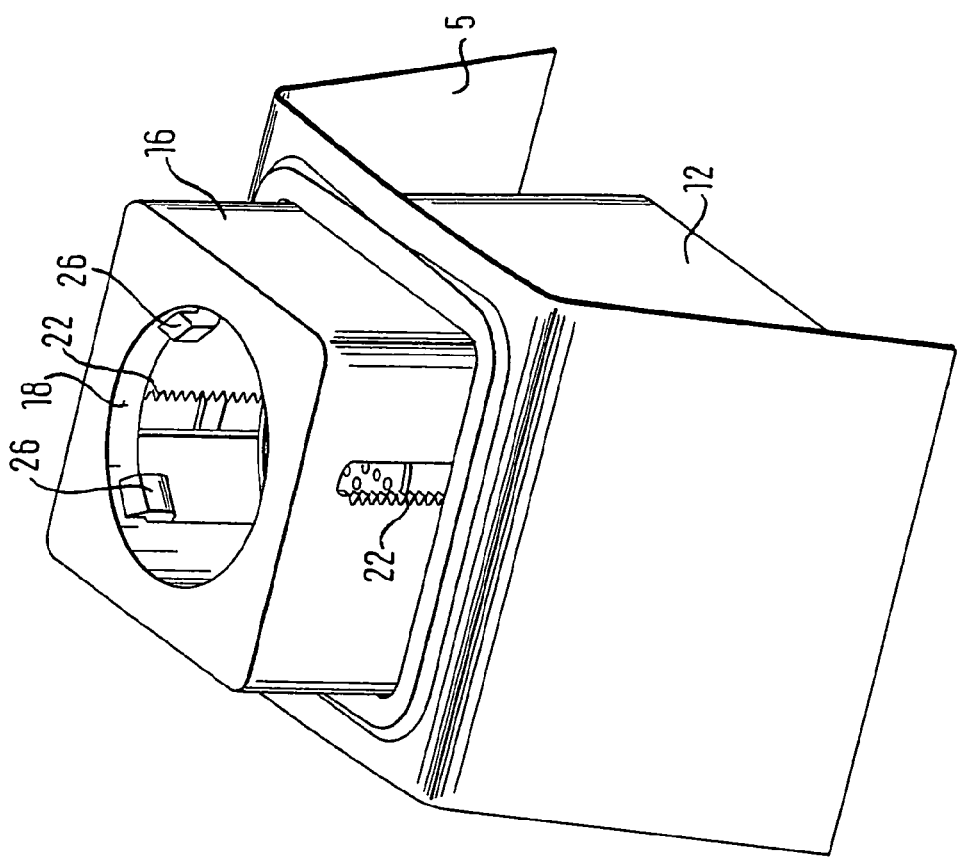
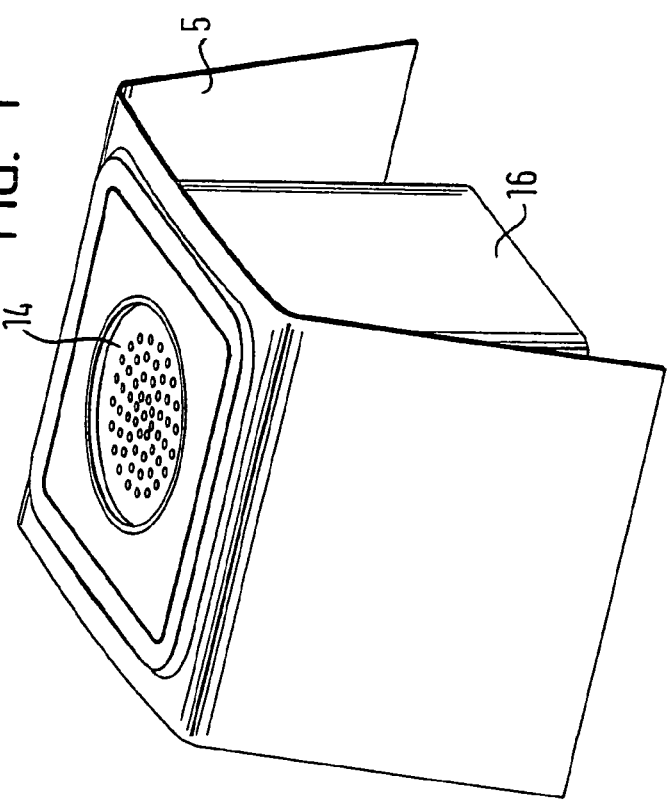

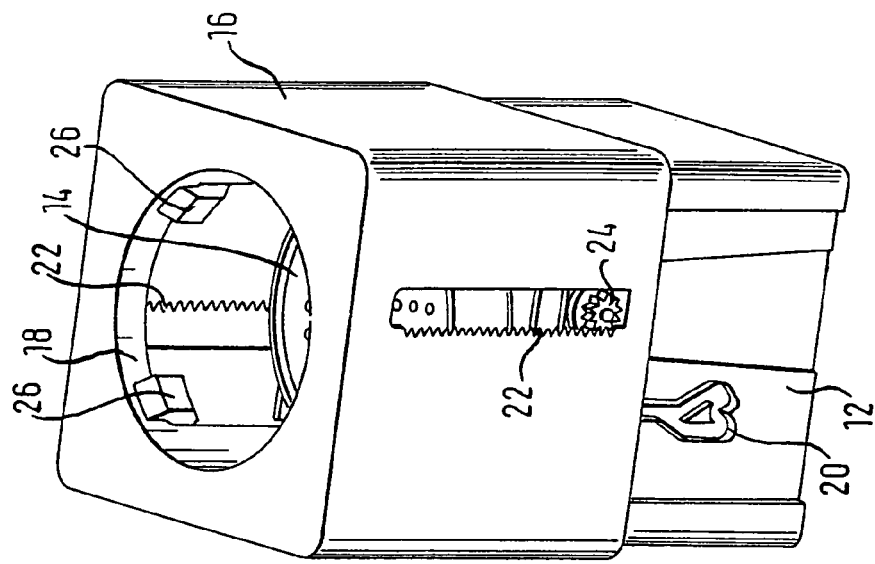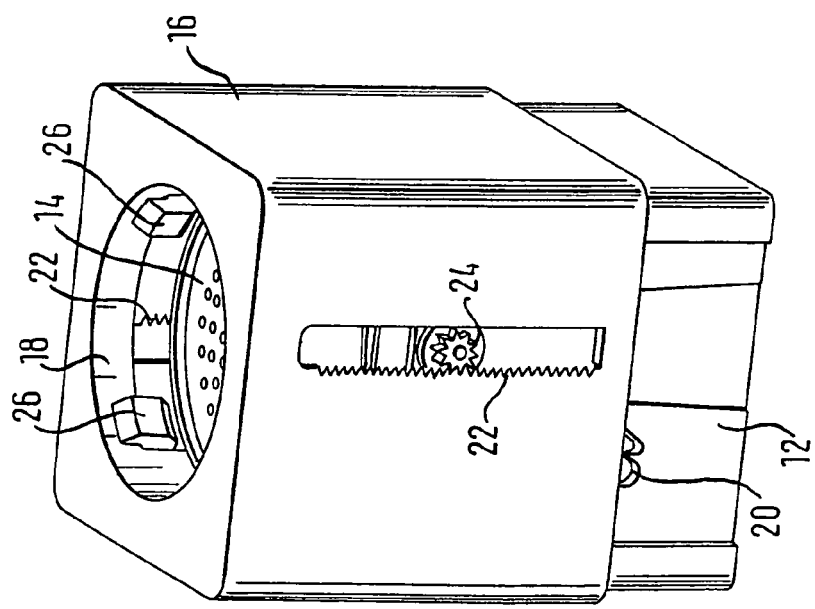

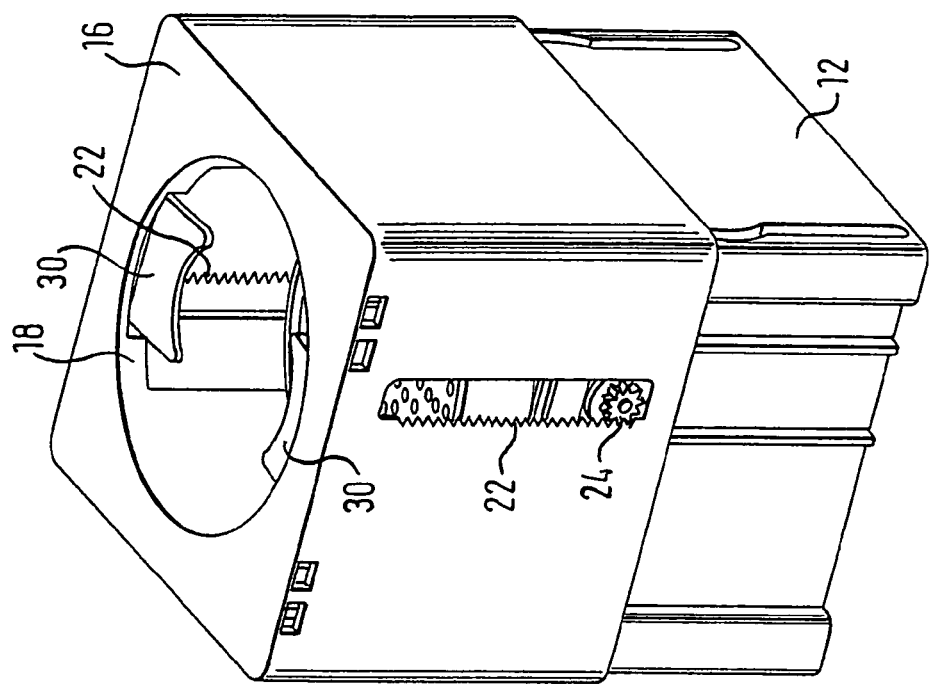
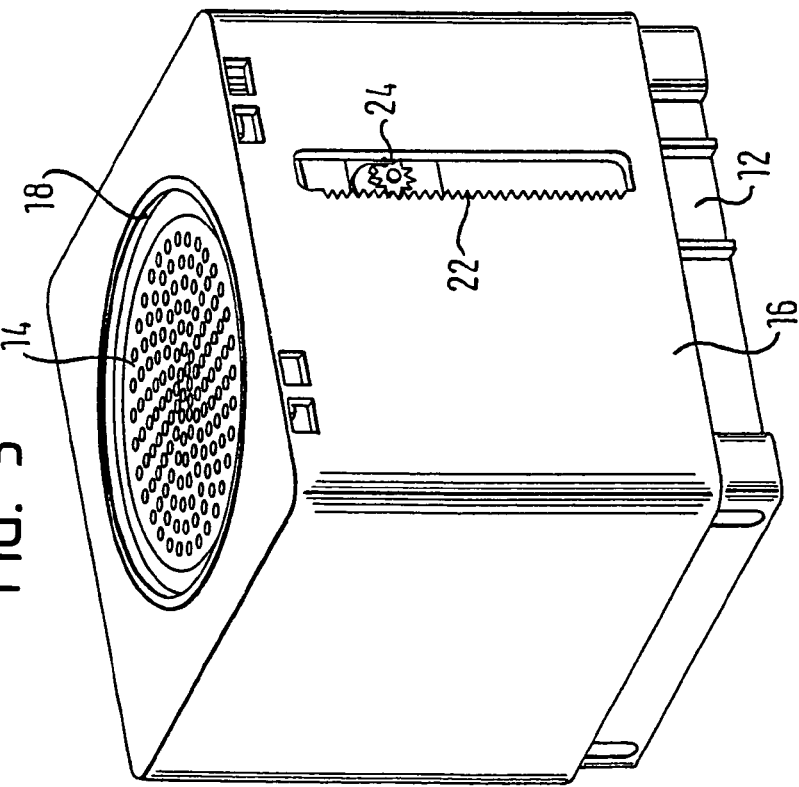

DRINKS HOLDER

FIELD OF THE INVENTION

The present invention relates to a cup holder of the type used especially in motor vehicles.

BACKGROUND OF THE INVENTION

Such a cup holder has to fulfill a multitude of requirements. First of all, it has to be able to securely accommodate and hold a large variety of different containers. Secondly, it has to be possible to move it from an operational position, in which it can accommodate the containers, into a stand-by position requiring a minimum of space, and vice versa. In the stand-by position, the cup holder should preferably not be visible, for example, it should be concealed behind a cover, or integrated in some other manner into a lining surrounding it so as to give an overall harmonious visual impression.

The cup holders known so far have not always successfully fulfilled these requirements.

SUMMARY OF THE INVENTION

The object of the invention is to provide a cup holder that fulfills the above-mentioned requirements.

For this purpose, according to the invention, a cup holder is provided, especially for a motor vehicle, comprising a box-like pedestal that has a placement surface on its top, and a box-like cover that is arranged over the pedestal, the side surfaces of the pedestal serving as a guide for the cover, the cover having a recess that is concentric with the placement surface. This cup holder distinguishes itself by its compact design, and the placement surface arranged visibly in the middle can serve to store, for example, coins or other small items when the cup holder is not being used.

Advantageous further developments of the invention are apparent from the subordinate claims.

BRIEF DESCRIPTION OF THE DRAWINGS

The invention will be described below with reference to two embodiments that are depicted in the accompanying drawings in which:

FIG. 1 shows a cup holder according to a first embodiment of the invention in the retracted state;

FIG. 2 shows the cup holder of FIG. 1 in the extended state;

FIG. 3 shows the cup holder in an intermediate state without the sheathing part;

FIG. 4 shows the cup holder of FIG. 3 in the extended state;

FIG. 5 shows a cup holder according to a second embodiment of the invention in the retracted state;

FIG. 8 shows the cup holder of FIG. 5 in the completely extended state.

DESCRIPTION OF EXAMPLE EMBODIMENTS

Figure 6:
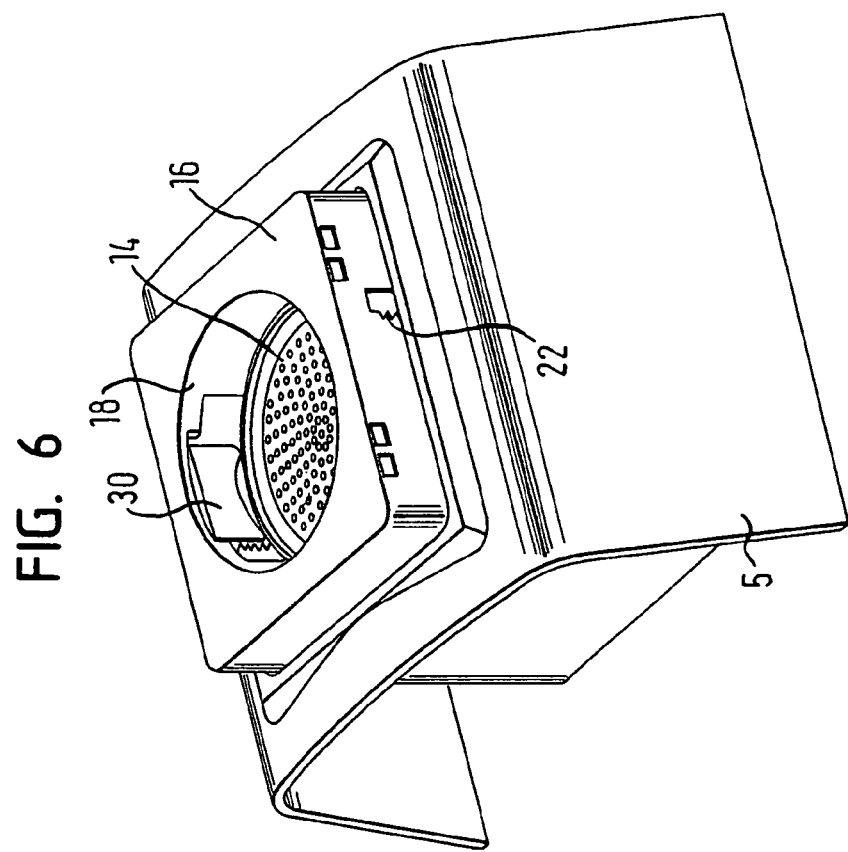
FIG. 6 shows the cup holder of FIG. 5 in a partially extended state.

FIGS. 1 to 4 show a cup holder according to a first embodiment of the invention. It can be installed in a lining part 5 of a motor vehicle, for example, the lining of the center console, and consists of a box-like pedestal part 12 that has a placement surface 14 on its top. This placement surface 14 is provided with an anti-slip rubber covering.

A box-like cover 16 is placed over the pedestal 12 so that the side walls of the cover 16 are guided along the side surfaces of the pedestal 12. In order to improve the guidance, the pedestal 12 and the cover 16 have cross sections that match each other and are preferably square. The cover 16 has a recess 18 that is concentric with the placement surface 14.

The cover 16 can be moved relative to the pedestal 12 between a retracted position (see FIG. 1) and an extended position (see FIG. 4). A spring (not shown) is provided that urges the cover 16 into the extended position. In the retracted position, the placement surface 14 is arranged approximately flush with the top of the cover 16 and inside the recess 18. The placement surface 14 can then be used to keep small items such as coins, etc.

In the retracted position, the cover 16 is held by a click-click locking mechanism of which a curved path 20 can be seen in FIGS. 3 and 4. Such a locking mechanism is generally known, so that it does not need to be discussed here in greater detail. By pressing on the cover 16, the locking mechanism is released so that the cover 16 is moved into the extended position (see FIG. 4). In order to prevent this from happening abruptly, a toothed rack 22 is arranged in the cover 16 and a toothed wheel 24 is arranged in the pedestal that engages with the toothed rack 22, more specifically on two sides opposite from each other, so as to ensure that the force is applied symmetrically. The two toothed wheels 24 are coupled to a damping means that can include a silicone damper.

On the rim of the recess 18, there is a plurality of elastic holding noses 26 each having an end face that faces the contact surface 14 and is beveled so that they automatically withdraw towards the outside when the cover 16 is moved into the retracted position and the holding noses strike the placement surface.

Figure 7:
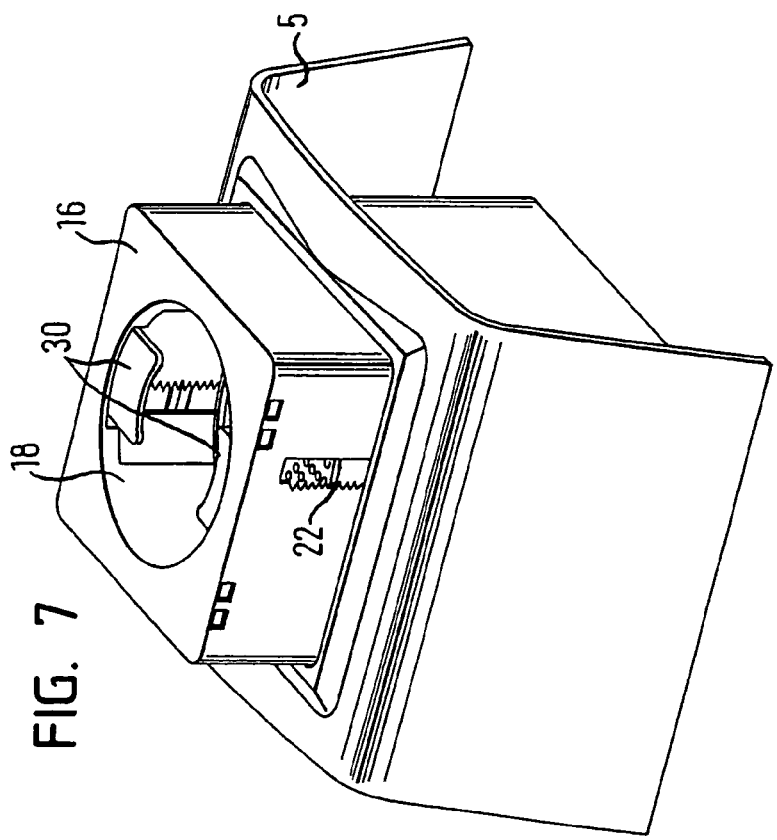
FIG. 7 shows the cup holder of FIG. 6 in the completely extended state.

FIGS. 5 to 8 show a cup holder according to a second embodiment. The difference from the first embodiment is that, instead of the holding noses 26, two holding tabs 30 are provided that are positioned across from each other. They can be adjusted between a folded-in position (see FIG. 6) and a folded-out position (see FIGS. 7 and 8); they are elastically urged into the folded-out position by a spring. Like the holding noses 26, the holding tabs 30 serve to hold and stabilize a container that is placed in the cup holder.

A rod mechanism (not shown) is provided by means of which the holding tabs 30 are moved from the folded-out position into the folded-in position as soon as the cover 16 is moved into the retracted position. Instead of the rod mechanism, it is also possible to use a cam mechanism that consists of a curved path and a tracing element that is in contact with it.

The invention claimed is:

1. A cup holder for a motor vehicle, the cup holder having a box-like pedestal (12) with outer side surfaces a and an outer placement surface (14) on its top, the pedestal (12) being stationary relative to the vehicle, the cup holder further having a box-like cover (16) which has side walls defining an interior space, the cover (16) being placed over the pedestal (12) so that the side walls of the cover (16) are guided along the outer side surfaces of the pedestal (12) and the pedestal extends into the interior space of the cover, the cover (16) having a recess (18) for supporting a cup, the recess being concentric with the outer placement surface (14) of the pedestal (12), said pedestal supporting said cover for movement relative to the vehicle.

2. The cup holder according to claim 1, characterized in that a plurality of elastic holding noses (26) is provided on the cover (16).

3. The cup holder according to claim 1, characterized in that the recess (18) of the cover (16) has a shape for receiving a cup.

4. The cup holder according to claim 1, characterized in that the cover (16) is movable relative to the pedestal (12) along an axis of the recess (18).

5. A holder for a cup, said holder comprising:
 a pedestal (12) having outer side surfaces and an outer top surface, said outer top surface defining a placement surface (14) for supporting the cup; and
 a cover (16) having inner side surfaces such that said outer side surfaces of said pedestal (12) slide along said inner side surfaces of said cover (16) and guide said cover (16) for movement of said cover (16) from a first position to a second position relative to said pedestal (12), said pedestal extending outwardly of said cover when said cover is in the second position,
 said cover (16) having a recess (18) extending through a top surface of said cover (16) for laterally supporting the cup on said placement surface (14).

6. The cup holder according to claim 1 wherein, the outer placement surface of the pedestal extends transverse to the outer side surfaces of the pedestal, the recess in the cover extending through a top of the cover extending generally parallel to the outer placement surface.

7. The cup holder according claim 1 wherein, the pedestal defines an interior space, the cover being spaced from the interior space of the pedestal.

8. The cup holder according to claim 1 wherein, the outer side surfaces of the pedestal extend in a first direction from the placement surface and the side walls of the cover extend in the same first direction from the recess.

* * * * *